(12) United States Patent
Hall et al.

(10) Patent No.: US 8,666,908 B2
(45) Date of Patent: Mar. 4, 2014

(54) SYSTEM AND METHOD FOR ACQUIRING INFORMATION DURING UNDERGROUND DRILLING OPERATIONS

(75) Inventors: Brent S. Hall, Cheshire, CT (US);
Derek J. Barnes, Conroe, TX (US);
Jadwiga Barnes, legal representative, Conroe, TX (US)

(73) Assignee: APS Technology, Inc., Wallingford, CT (US)

( * ) Notice: Subject to any disclaimer, the term of this patent is extended or adjusted under 35 U.S.C. 154(b) by 612 days.

(21) Appl. No.: 12/563,007

(22) Filed: Sep. 18, 2009

(65) Prior Publication Data
US 2010/0008188 A1    Jan. 14, 2010

Related U.S. Application Data

(63) Continuation of application No. 11/156,002, filed on Jun. 17, 2005, now abandoned.

(51) Int. Cl.
*G06Q 99/00* (2006.01)
(52) U.S. Cl.
USPC ................ 705/400; 705/1.1; 705/7.11
(58) Field of Classification Search
USPC .......................... 705/400, 1.1, 7.11
See application file for complete search history.

(56) References Cited

U.S. PATENT DOCUMENTS

| | | | |
|---|---|---|---|
| 5,360,066 A * | 11/1994 | Venditto et al. | 166/250.1 |
| 6,484,819 B1 | 11/2002 | Harrison | |
| 6,714,138 B1 | 3/2004 | Turner et al. | |
| 7,327,364 B2 | 2/2008 | Perry | |
| 7,389,830 B2 | 6/2008 | Turner | |
| 2002/0169645 A1 * | 11/2002 | Aronstam et al. | 705/7 |
| 2006/0034154 A1 * | 2/2006 | Perry et al. | 367/84 |
| 2006/0283632 A1 | 12/2006 | Hall | |

FOREIGN PATENT DOCUMENTS

| | | | |
|---|---|---|---|
| EP | 1514996 A | 3/2005 | |
| FR | 2622920 A | 5/1989 | |

OTHER PUBLICATIONS

Hartley, F., "Automated Vertical Drilling Unit Targets Downhole Mechanical Failures Case Studies Show Performance," Offshore, Oct. 2001, 61(10), pp. 44, 156, XP001116685.
Technical Data Sheet: APS CheckShotTM Survey-While-Drilling ("SWD") system, 2 pages, Feb. 2004.
In Re. Serial No. 11156002, Non Final Office Action dated Aug. 23, 2007.
In Re. Serial No. 11156002, Final Rejection dated Jun. 3, 2008.
In Re. Serial No. 11156002, Non Final Office Action dated Sep. 16, 2008.
In Re. Serial No. 11156002, Final Rejection dated Mar. 19, 2009.
International Search Report dated Apr. 12, 2007 WO2006138651 A3 Hall.

* cited by examiner

*Primary Examiner* — Akiba Allen
(74) *Attorney, Agent, or Firm* — Baker & Hostetler LLP

(57) ABSTRACT

A preferred method for acquiring information during an underground drilling operation includes providing a sensing device capable of acquiring information concerning the underground drilling operation from a down-hole location on a selective basis in response to an input from the surface, and drilling for a first period of time. The preferred method also includes sending the input to the sensing device after drilling for the first period of time, and drilling during a second period of time while acquiring the information using the sensing device.

30 Claims, 7 Drawing Sheets

SYSTEM AND METHOD FOR ACQUIRING INFORMATION DURING UNDERGROUND DRILLING OPERATIONS

CROSS REFERENCE TO RELATED APPLICATION

This application is a continuation of U.S. patent application Ser. No. 11/156,002 filed Jun. 17, 2005, pending.

FIELD OF THE INVENTION

The present invention relates to underground drilling. More specifically, the invention relates to a system and method for acquiring information, such as directional guidance information, during underground drilling operations.

BACKGROUND OF THE INVENTION

Underground drilling, such as gas, oil, or geothermal drilling, generally involves drilling a bore through a formation deep in the earth. Such bores are formed by connecting a drill bit to long sections of pipe, referred to as "drill pipe," so as to form an assembly commonly referred to as a "drill string." The drill string extends from the surface to the bottom of the bore.

The drill bit is rotated so that the drill bit advances into the earth, thereby forming the bore. In a drilling technique commonly referred to as rotary drilling, the drill bit is rotated by rotating the drill string at the surface. In other words, the torque required to rotate the drill bit is generated aboveground, and is transferred to the drill bit by way of the drill string.

Alternatively, the drill bit can be rotated by a drilling motor. The drilling motor is usually mounted in the drill string proximate the drill bit. The drill bit can be rotated by the drilling motor alone, or by rotating the drill string while operating the drilling motor.

One type of drilling motor known as a "mud motor" is powered by drilling mud. Drilling mud is a fluid that is pumped under high pressure from the surface, through an internal passage in the drill string, and out through the drill bit. The drilling mud lubricates the drill bit, and flushes cuttings from the path of the drill bit. The drilling mud then flows to the surface through an annular passage formed between the drill string and the surface of the bore.

In a drill string equipped with a mud motor, the drilling mud is routed through the drilling motor. The mud motor is equipped with a rotor that generates a torque in response to the passage of the drilling mud therethrough. The rotor is coupled to the drill bit so that the torque is transferred to the drill bit, causing the drill bit to rotate.

Drilling operations can be conducted on a vertical, horizontal, or directional basis. Vertical drilling refers to drilling in which the trajectory of the drill-string is inclined approximately 10° or less in relation to the vertical. Horizontal drilling refers to drilling in which the drill-string trajectory is inclined approximately 90°. Directional drilling refers to drilling in which the trajectory of the drill-string is inclined between approximately 10° and approximately 90°.

Various systems and techniques can be used to perform directional and horizontal drilling. For example, so-called steerable systems use a drilling motor with a bent housing. A steerable system can be operated in a sliding mode in which the drill string is not rotated, and the drill bit is rotated exclusively by the drilling motor. The bent housing steers the drill bit in the desired direction as the drill string slides through the bore, thereby effectuating directional drilling. Alternatively, the steerable system can be operated in a rotating mode in which the drill string is rotated while the drilling motor is running. This technique results in a substantially straight bore.

So-called rotary steerable tools can also be used to perform directional drilling. One particular type of rotary steerable tool can include pads located on the drill string, proximate the drill bit. The pads can extend and retract with each revolution of the drill string. Alternatively, in a system that uses a non-rotating sleeve, the pads can remain fixed so that the pads exert a continuous side force. The contact the between the pads and the surface of the drill hole exerts a lateral force on the string. This force pushes or points the drill bit in the desired direction of drilling. A substantially straight bore is drilled when the pads remain in their retracted positions.

All wells typically require monitoring to determine the trajectory of the drill bit through the earth. Such monitoring typically utilizes the measurements of the bore's inclination, sometimes referred to as drift, which is the angle of the bore measured from vertical and the direction or azimuth of any such inclination measured from true north.

In addition, when drilling in "sliding mode," i.e., while the drill string is not rotating, directional and horizontal drilling require real-time knowledge of the angular orientation of a fixed reference point on the circumference of the drill string in relation to a reference point on the bore. The reference point is typically magnetic north in a vertical well, or the high side of the bore in an inclined well. This orientation of the fixed reference point is typically referred to as "tool face," or "tool face angle."

Drill strings used for directional and horizontal drilling typically are equipped with a measurement while drilling (MWD) tool to provide tool face readings. The MWD tool is usually mounted in the bottom-hole assembly of the drill string. The MWD tool can include sensors for providing the measurements needed to determine tool face. An MWD tool typically includes three accelerometers mounted on orthogonal axes, whose readings may be used to determine inclination and tool face, and a triaxial magnetometer whose readings, in conjunction with those of the accelerometers, may be used to determine the azimuth heading. The MWD tool can also include a signal processor programmed to calculate tool face based on the noted measurements.

These orientation readings generated by the MWD tool need to be transmitted to the surface on a real-time basis for interpretation and analysis. Such data transmission is usually accomplished using a technique referred to as "mud-pulse telemetry." In a typical mud-pulse telemetry system, electrical signals representing directional or other information are received and digitally encoded by a microprocessor-based encoder located in the MWD tool.

The output of the encoder can be transmitted to an electrically-powered pulser. The pulser forms part of the bottom hole assembly, and generates pressure pulses in the drilling mud in response to the output of the encoder. The pulser can generate the pulses by intermittently restricting the flow area of the drilling mud so as to back pressure the column of drilling mud located up-hole thereof.

The digitally-encoded information generated by the encoder is incorporated into the pulses. The pulses can be defined by a variety of characteristics, including amplitude (the difference between the maximum and minimum values of the pressure), duration (the time interval during which the pressure is increased), shape, and frequency (the number of pulses per unit time or, conversely, the time between pulses).

Various encoding systems have been developed using one or more pressure pulse characteristics to represent binary data, i.e., the binary digits 1 or 0. For example, a pulse of 0.5 second duration can be designated as representing the binary digit 1. A pulse of 1.0-second duration can be designated as representing the binary digit 0. Other examples can include hexadecimal encoding that uses similar techniques of pulse placement, but assigns different values to the detected positions of the generated pulses.

The pulses travel up the column of drilling mud flowing down to the drill bit, and are sensed by a pressure transducer located at or near the surface. The data from the pressure transducer is then decoded and analyzed electronically by the surface receiver, and the resulting information can be analyzed by the personnel operating the drilling rig, or other users.

Encoded data can be sent down-hole from the surface. One type of encoding system utilizes pressure by pulsing the drilling mud at or near the surface. A pressure transducer can be installed in the MWD tool to sense the pressure pulses. The encoder of the MWD tool can be programmed to decide the output signal of pressure transducer. Guidance information can thus be sent from the surface to the steering means to guide the drill bit in a desired direction. Other communication techniques can use rotation, applied weight, acoustic pulses, and electromagnetic carrier waves. These types of techniques are typically multi event and complex.

As the MWD tool and the pulser are operated on a substantially continuous basis during directional or horizontal drilling operations, a substantial amount of electrical power can be required during such operations. Electrical power can be supplied by batteries located in the down-hole assembly. In such applications, the power requirements of the MWD tool and (more so) the pulser, can drain the batteries, thereby necessitating a time-consuming removal of the drill string so that the batteries can be replaced.

Alternatively, the drill string can be equipped with a device such as a turbine-driven alternator to power the MWD tool (and the other electrical components of bottom-hole assembly).

A typical MWD tool is relatively complex and expensive. Moreover, interpretation and analysis of the directional information provided by the MWD tool is usually performed by an engineer or technician with specialized training (rather than the drill-rig operators), due to the relative complexity of these tasks.

Determining tool face on a continuous basis, in general, is not required during vertical drilling. Directional information associated with vertical drilling may be obtained as needed by performing a static survey when rotation of the drill string is interrupted to add another section of drill pipe. A static survey could be conducted, for example, by lowering a compass, a plumb line, and a camera through the drill string, and photographing the compass and plumb line when the compass and plumb line reach the bottom of the drill string.

The directional information obtained during the static survey is used to determine whether the trajectory of the bore has deviated from the vertical direction and, if so, the extent and direction of the deviation. Deviation beyond a predetermined amount, e.g., 5°, may necessitate corrective action to return the trajectory of the bore to within the limits of what is considered "vertical."

This corrective action may necessitate removing the drill string from the bore, and configuring the drill string for directional drilling. For example, the down-hole assembly can be configured with a steerable drilling assembly comprising a mud motor or other suitable device for steering the drill bit. An MWD tool with mud-pulse telemetry equipment can also be added to the bottom-hole assembly to generate and transmit the tool-face angle data required for directional drilling. The effort required to remove and reconfigure the drill string can be substantial, and can adversely affect the schedule of drilling operations. Moreover, specially-trained engineers or technicians need to be brought on site to install the MWD tool, and to interpret and analyze the directional data from the MWD tool, which can further increase the costs and scheduling impact associated with correcting the deviation in the bore.

Static surveys may also be required by various regulatory authorities, to verify that a well remains within predetermined geographic boundaries. Static surveys acquired for this purpose must usually be overseen by a qualified surveyor located on-site as the survey is conducted. The term "qualified surveyor," as used herein, refers to a surveyor who is qualified, certified, or otherwise approved by the governing regulatory authority to oversee the static survey.

If deviation data has been obtained during normal drilling operations, without a qualified surveyor in attendance, owners of the mineral rights and/or the regulatory authorities may require that the bottom hole location be verified and certified by a separate survey device operated by a qualified surveyor. This can involve substantial costs resulting from additional expenditures of time, and additional service fees. Therefore, the need for on-site oversight can potentially delay, and thereby increase the expense of, the drilling operation.

SUMMARY OF THE INVENTION

A preferred method for forming a bore in an earth formation comprises drilling on a straight-hole basis using a drill string comprising a sensing device configured to generate tool-face readings on a selective basis, and a telemetry system for transmitting the tool face readings to the surface, so that the drill string advances in to the earth formation, while the sensing device is in an inactive mode in which the sensing device does not generate the tool-face readings.

The method also comprises performing a static survey to determine drift of the bore after drilling on a straight-hole basis and, if the drift of the bore exceeds a predetermined limit, drilling in the earth formation on a directional basis using the drill string, while the sensing device is in an active mode in which the sensing device generates the tool-face readings.

A preferred method for acquiring information during an underground drilling operation comprises providing a sensing device capable of acquiring information concerning the underground drilling operation from a down-hole location on a selective basis in response to an input from the surface, and drilling for a first period of time. The preferred method also comprises sending the input to the sensing device after drilling for the first period of time, and drilling for a second period of time while acquiring the information using the sensing device.

A preferred method is provided for allocating costs associated with the use of a system capable of generating and transmitting information concerning an underground drilling operation on a selective basis. The preferred method comprises providing the system to a user, and charging a usage rate based on an amount of the information acquired by the sensing device during the underground drilling operation.

A preferred embodiment of a system for providing information during an underground drilling operation comprises a sensing device comprising a sensor, and a signal processor communicatively coupled to the sensor. The sensing device generates static survey information concerning the underground drilling operation in response to a first predetermined criterion. The sensing device generates tool face readings concerning the underground drilling operation on a substantially continuous basis in response to a second predetermined criterion.

The system also comprises a telemetry system communicatively coupled to the sensing device for transmitting the static survey information and the tool face readings to the surface.

BRIEF DESCRIPTION OF THE DRAWINGS

The foregoing summary, as well as the following detailed description of a preferred embodiment, are better understood when read in conjunction with the appended diagrammatic drawings. For the purpose of illustrating the invention, the drawings show an embodiment that is presently preferred. The invention is not limited, however, to the specific instrumentalities disclosed in the drawings. In the drawings.

DETAILED DESCRIPTION OF PREFERRED EMBODIMENTS

The figures depict a preferred method, and a preferred embodiment of a system 10 for acquiring information during underground drilling operations. The system 10 comprises a sensing device in the form of a direction measurement unit 12, a telemetry system 14, and a display module 18. The system 10, as discussed below, can be used to conduct static surveys required during vertical drilling to verify that the drift of the bore formed by the drilling operation is within predetermined limits. The system 10 can also acquire tool face readings on a selective, as-needed basis.

Figure 1:
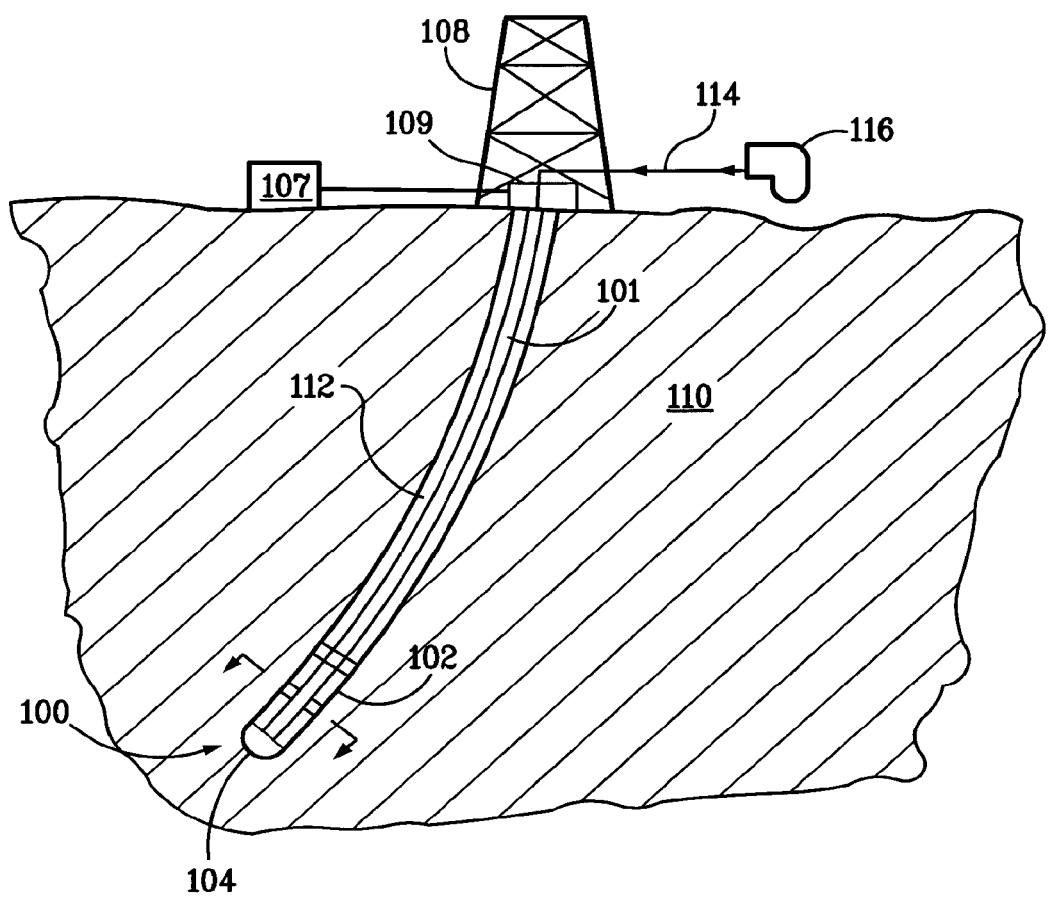
FIG. 1 is a side view of a drill string incorporating a preferred embodiment of a system for acquiring information during underground drilling operations, depicting the drill string within a bore formed in an earth formation by the drill string.
Figure 2:
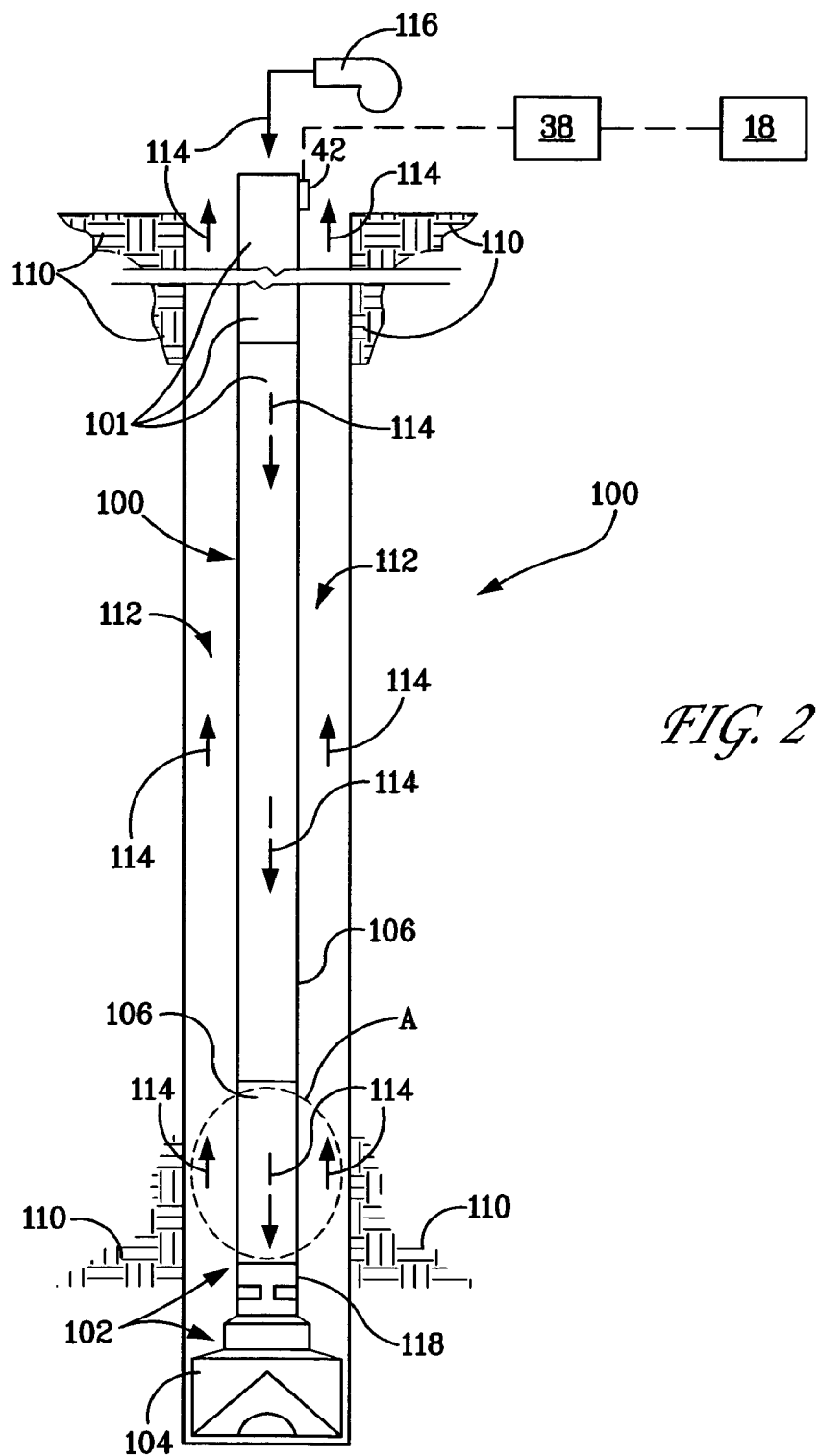
FIG. 2 is another side view of the drill string shown in FIG. 1, showing additional detail of the drill string.

The system 10 can be used as part of a drill string 100 (see FIGS. 1 and 2). The drill string 100 is formed from interconnected sections of drill pipe 101, and a bottom hole assembly 102. The bottom hole assembly 102 comprises a drill bit 104, and a drill collar 106. The drill collar 106 couples the drill bit 104 and the lowermost section of drill pipe 101, and weights the drill bit 104 to improve the performance thereof.

The drill string 100 is rotated by a motor 107 of a drilling rig 108 located on the surface, as shown in FIG. 1. Drilling torque can be transmitted from the motor 107 to the drill string 100 through a turntable 109, and a kelly (not shown). Drilling torque is transmitted to the drill bit 104 by way of the drill pipe 101 and the drill collar 106. The rotating drill bit 104 advances into an earth formation 110, thereby forming a bore 112.

Drilling mud 114 is pumped from the surface, through the sections of drill pipe 101 and the drill collar 106, and out of the drill bit 104. The drilling mud 114 is circulated by a pump 116 located on the surface. The drilling mud 114, upon exiting the drill bit 104, returns to the surface by way of an annular passage formed between the section of drill pipe 101 and the surface of the bore 112, as depicted in FIG. 2.

The bottom-hole assembly 102 preferably is configured for directional drilling. For example, the bottom hole assembly 102 can include a rotary steerable tool 118 located between the drill collar 106 and the drill bit 104. The rotary steerable tool 118 includes pads that extend and retract with each revolution of the drill string 100. Contact between the pads and the surface of the bore 112 exerts a lateral force on the drill string 100. This force pushes or points the drill bit 104 in the desired direction of drilling. The bore 112 is drilled in a substantially straight direction when the pads remain in their retracted positions.

The use of the rotary steerable tool 118 to perform directional drilling is specified for exemplary purposes only. The drill string 100 can be equipped with other means for performing directional drilling, such as a drilling motor with a bent housing. Alternatively, the drill string 100 can be equipped with a rotary steerable motor as described in U.S. application Ser. No. 11/117,802, filed Apr. 29, 2005, the contents of which is incorporated by reference herein in its entirety.

Figure 3:
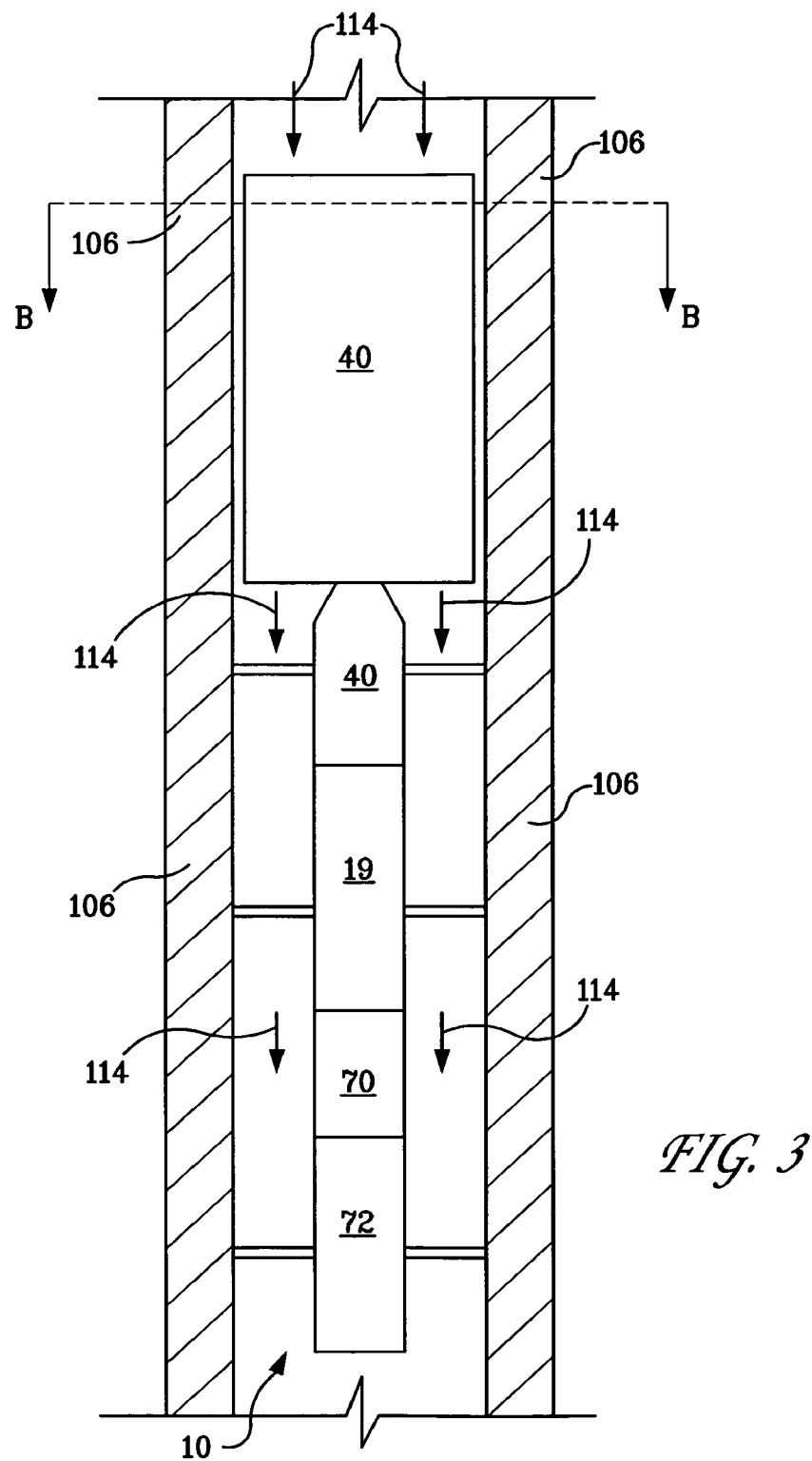
FIG. 3 is a magnified view of the area designated "A" in FIG. 2, depicting a drill collar of the drill string in longitudinal cross-section.

The direction measurement unit 12 can be housed within a pressure barrel 19. The pressure barrel 19 can be suspended within the drill collar 106, up-hole of the drill bit 104, as shown in FIG. 3. The pressure barrel 19 preferably is formed from beryllium copper or non-magnetic, high-strength stainless steel.

Figure 6:
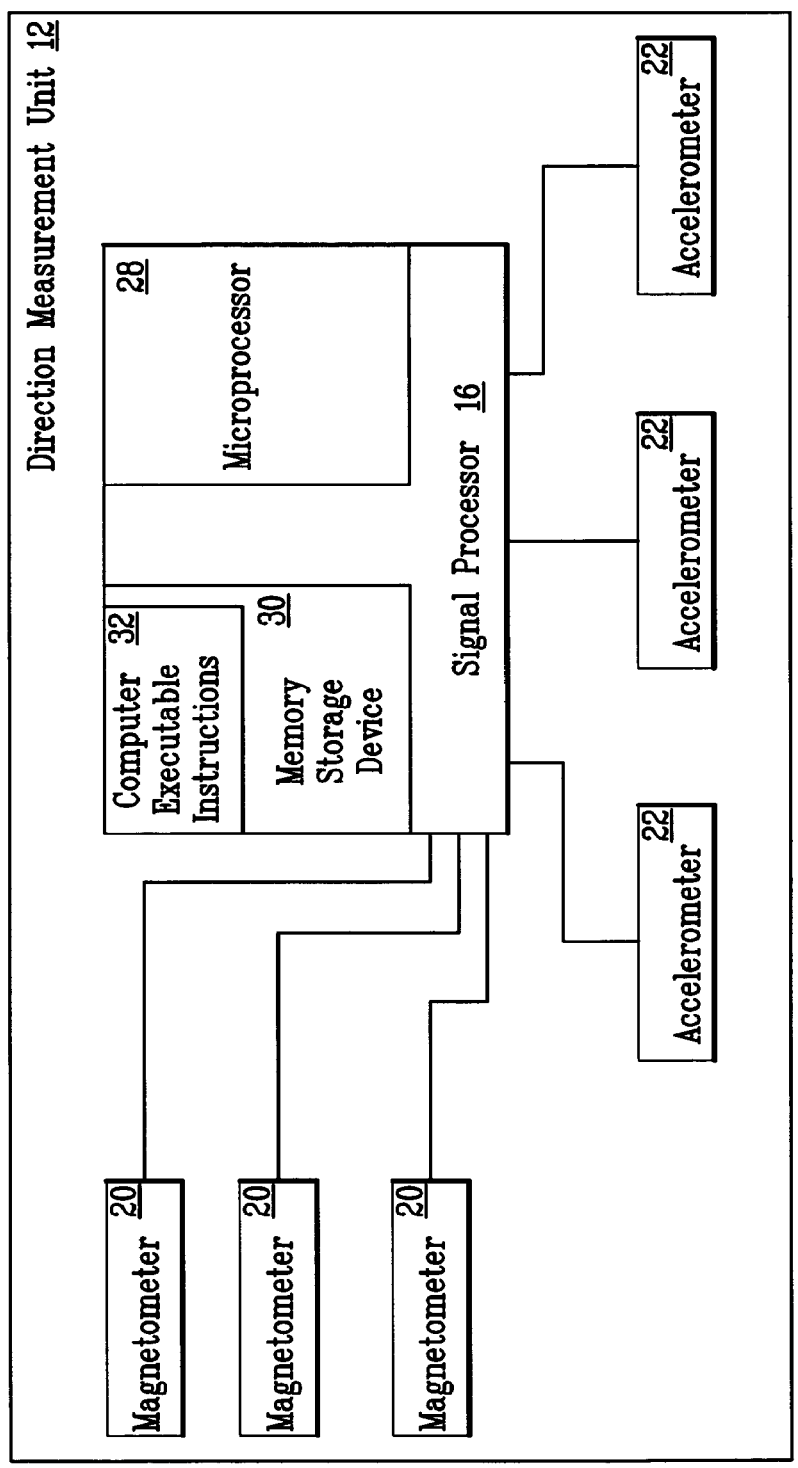
FIG. 6 is a block diagram depicting a direction measurement unit of the system shown in FIGS. 1-5.

The direction measurement unit 12 can include three magnetometers 20 for measuring azimuth about three orthogonal axes, and three accelerometers 22 for measuring inclination about the three orthogonal axes (see FIG. 6). The direction measurement unit 12 can also include a signal processor 16 communicatively coupled to each of the magnetometers 20 and accelerometers 22.

The signal processor 16 can comprise a processor such as a microprocessor 28, and a memory storage device 30 communicatively coupled to the microprocessor 28. The direction measurement unit 12 can also include a set of computer-executable instructions 32 stored on the memory storage device 30. The signal processor 16 can be packaged as a board mounted within the pressure barrel 19. The signal processor 16 can be isolated from shock and vibration by a suspension or other suitable means.

The signal processor 16 can be programmed to calculate the azimuth and inclination of the bore 112 based on the readings of the magnetometers 20 and accelerometers 22, respectively, using conventional techniques known to those skilled in the art of underground drilling. As discussed below, static surveys can be conducted at predetermined intervals to determine azimuth and inclination. The resulting data can be transmitted to the surface for analysis using the telemetry system 14.

The signal processor 16 can also be programmed to calculate the tool face of the drill bit 104 based on the readings of the magnetometers 20 and accelerometers 22, using conventional techniques known to those skilled in the art of underground drilling. Alternatively, tool face can be calculated based on the techniques described in U.S. provisional application No. 60/676,072, filed Apr. 29, 2005, the contents of which is incorporated by reference herein in its entirety.

The direction measurement unit 12 generates a digital output representative of the inclination, azimuth, and tool face readings. For example, the direction measurement unit 12 can generate a digital output in the form of four-bit "nybbles," where each nybble represents a hexadecimal digit. Other digital formats can be used for the output of the direction measurement unit 12, in the alternative.

The drill string 100 can be used to drill directionally if the drift of the bore 112, as determined from the static survey, exceeds a predetermined criterion, e.g., greater than 5° inclination. A particular criterion for the acceptable amount of drift is specified for exemplary purposes only. The acceptable amount of drift is application-dependent, and is often expressed as a function of both inclination and azimuth.

The drill bit 104 can be guided from the surface to alter the direction of the bore 112, so as to place the drift of the bore 112 within limits. As discussed below, the system 10 can calculate and transmit tool face readings during directional drilling, to provide the directional guidance required for such drilling.

Figure 4:
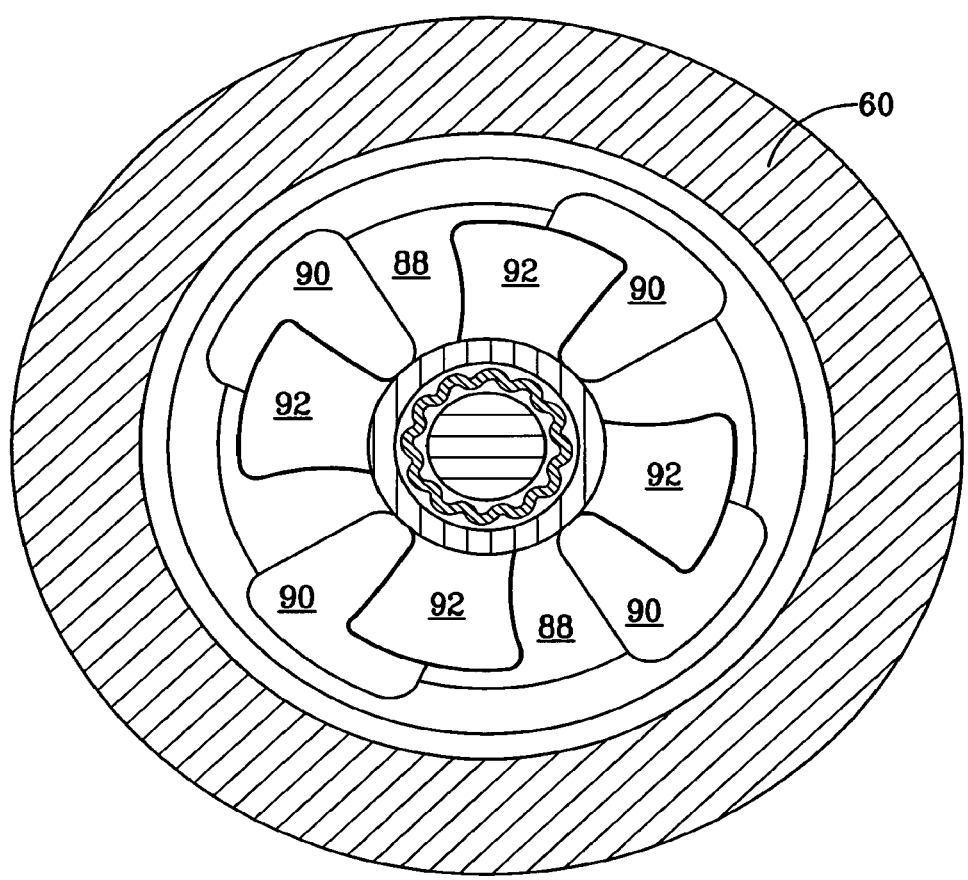
FIG. 4 is a cross-sectional view taken through the line "B-B" of FIG. 3.

The telemetry system 14 preferably transmits data from the bottom-hole assembly 102 to the surface using mud-pulse telemetry. The telemetry system 14 can include an encoder 36, a decoder 38, a pulser 40, and a pressure transducer 42 (see FIGS. 3-5).

Figure 5:
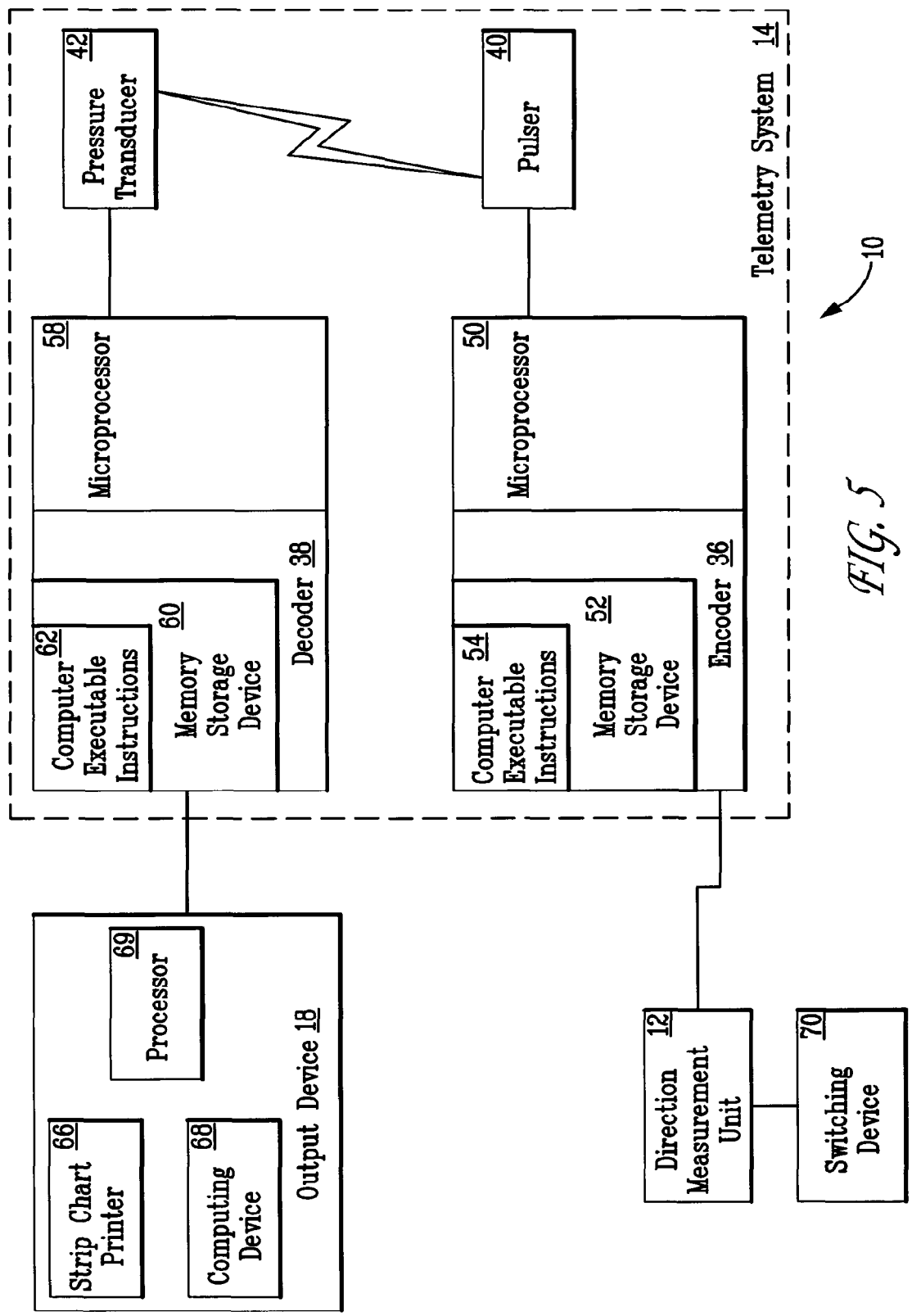
FIG. 5 is a block diagram depicting the system shown in FIGS. 1-4.

The encoder 36 can be packaged as a board mounted within the pressure barrel 19. The encoder 36 can be isolated from shock and vibration by a suspension or other suitable means. The encoder 36 is communicatively coupled to the sensor board 16 of the direction measurement unit 12, as shown in FIG. 5. The encoder 36 receives the digitized output of the direction measurement unit 12 representative of the inclination, azimuth, and tool face readings generated by the direction measurement unit 12.

The encoder 36 can comprise a processor such as a microprocessor 50, and a memory storage device 52 communicatively coupled to the microprocessor 50. The encoder 36 can also include a set of computer-executable instructions 54 stored on the memory storage device 52.

The pulser 40 is communicatively coupled to the encoder 36. The pulser 40 is suspended within the drill collar 106, up-hole of the pressure barrel 19. The pulser 40 generates pressure pulses in the column of drilling mud 114 being pumped down-hole through the drill collar 106, in response to inputs from the encoder 36. In particular, the encoder 36 processes the digitized inclination, azimuth, or tool face information received from the direction measurement unit 12. The encoder 36 encodes the information as a series of pressure pulses in the drilling mud 114 by issuing commands to the pulser 40. The information can be encoded in the pulses (and subsequently decoded) based on the amplitude, width, or time separation of the pulses, using techniques known to those skilled in the art of underground drilling.

Each pulse preferably has a predetermined duration and amplitude that makes the pulse suitable for detection by the pressure transducer 42. For example, each pulse can have a duration of approximately 1.5 seconds, and an amplitude of approximately ten to approximately one-hundred pounds per square inch. Specific values for the duration and amplitude of the pulses are provided for exemplary purposes only. Other values for each of these parameters can be used in alternative embodiments.

The pulser 40 can include a stator 88 that forms passages 90 through which the drilling mud 114 flows (see FIG. 3). The pulser 40 also can include a rotor 92 positioned upstream or downstream of the stator 88. The rotor 92 can be rotated continuously by the drilling mud 114. (This type of pulser is commonly referred to as a mud siren.)

The rotor 92 can be rotated incrementally, in the alternative. The incremental movement can be achieved by oscillating the rotor 92, or by incrementally rotating the rotor 92 in one direction. The movement of the rotor 92 in relation to the stator 88 causes the blades of the rotor 92 to alternatively increase and decrease the degree to which the blades obstruct the stator passages 90, thereby generating pulses in the drilling mud 114. Preferably, the pulser 40 can be converted between a fixed-mount and a retrievable configuration, to provide the user with flexibility in choosing either mounting configuration. A suitable pulser 40 can be obtained, for example, from APS Technology, Inc. of Cromwell, Conn. Pulsers suitable for use as part of the telemetry system 14 are described in U.S. Pat. No. 6,714,138 (Turner et al.), and U.S. application Ser. No. 10/888,312, filed Jul. 9, 2004. Each of these documents is incorporated by reference herein in its entirety.

Other means for generating pressure pulses include opening and closing a poppet valve, or opening a valve that permits some of the drilling mud to port from the center bore to the annulus between the drill collar and the well bore wall (thus generating a negative pressure pulse). Either of these means can be used in lieu of the pulser 40 in alternative embodiments. Moreover, the signal can be transmitted using acoustic or electromagnetic transmission techniques, either in discrete pulses or as part of a carrier wave, in other alternative embodiments.

The pressure transducer 42 preferably is a strain-gauge pressure transducer. The pressure transducer 42 is located within the column of drilling mud 114, proximate the surface (see FIG. 2). The pulses generated in the drilling mud 114 by the pulser 40 propagate up-hole through the drill string 100, and are sensed by the pressure transducer 42. The pressure transducer 42 generates an electrical output representative of the amplitude and duration of the pulses.

The decoder 38 is located on the surface, and can be configured as a stand-alone unit. The decoder 38 is communicatively coupled to the pressure transducer 42. The decoder 38 can include a processor such as a microprocessor 58, and a memory storage device 60 communicatively coupled to the microprocessor 58 (see FIG. 5). The decoder 38 can also include a set of computer-executable instructions 62 stored on the memory storage device 60.

The decoder 38 is configured to decode the directional guidance information encoded in the pressure pulses. The decoder 38 thus places the information in a format suitable for analysis by the end user of the information, e.g., the drill rig operators, on-site technicians or engineers, etc.

The telemetry system 14 is configured to transmit data in the up-hole direction only. Alternative embodiments of the system 10 can include telemetry systems capable of transmitting in the both up-hole and down-hole directions.

The decoder 38 is communicatively coupled to the display module 18. The display module 18 can include one or more output devices configured to display, store, transmit, or otherwise process the output from the decoder 38. For example, the display module 18 can include a strip chart recorder 66 to provide a basic readout of the information output by the decoder 38.

In applications where greater data processing capability is required or desired, the display module 18 can include can include a computing device 68, such as a personal computer, that facilitates processing and monitoring of the information on-site, on a real-time basis. Alternatively, the output of the decoder 38 can be transmitted for monitoring or storage off-site. Data transmission can be accomplished by any suitable means, such as wireless transmission, the internet, an intranet, etc.

The computing device 68 can also be programmed to store the information output by the decoder 38, so that the information can be accessed and analyzed at a later time.

The system 10 can also include a switching device 70 that senses whether drilling mud 114 is being pumped through the drill string 100 (see FIGS. 3 and 5). The switching device 70 is communicatively coupled to the direction measurement unit 12. A suitable switching device 70 can be obtained from APS Technology, Inc. as the FlowStat™ Electronically Activated Flow Switch.

The system 10 can further comprise one or more batteries 72 for powering the pulser 40, encoder 36, and direction measurement unit 12 (see FIG. 3). Alternatively, power can be supplied by a turbine-alternator assembly or other suitable power source.

The battery 72 and the switching device 70 can be suspended within the drill collar 106, down hole of the pulser 40 and the pressure barrel 19.

The system 10, as noted previously, can provide directional guidance information during vertical drilling operations in the form of static survey data. The system 10 can also provide tool face readings on a substantially continuous basis. The system 10 can thus facilitate directional drilling to correct unacceptable drift in the bore 112, without a need to raise the drill string 100 to the surface to reconfigure the drill string 100 for directional drilling.

Figure 7:
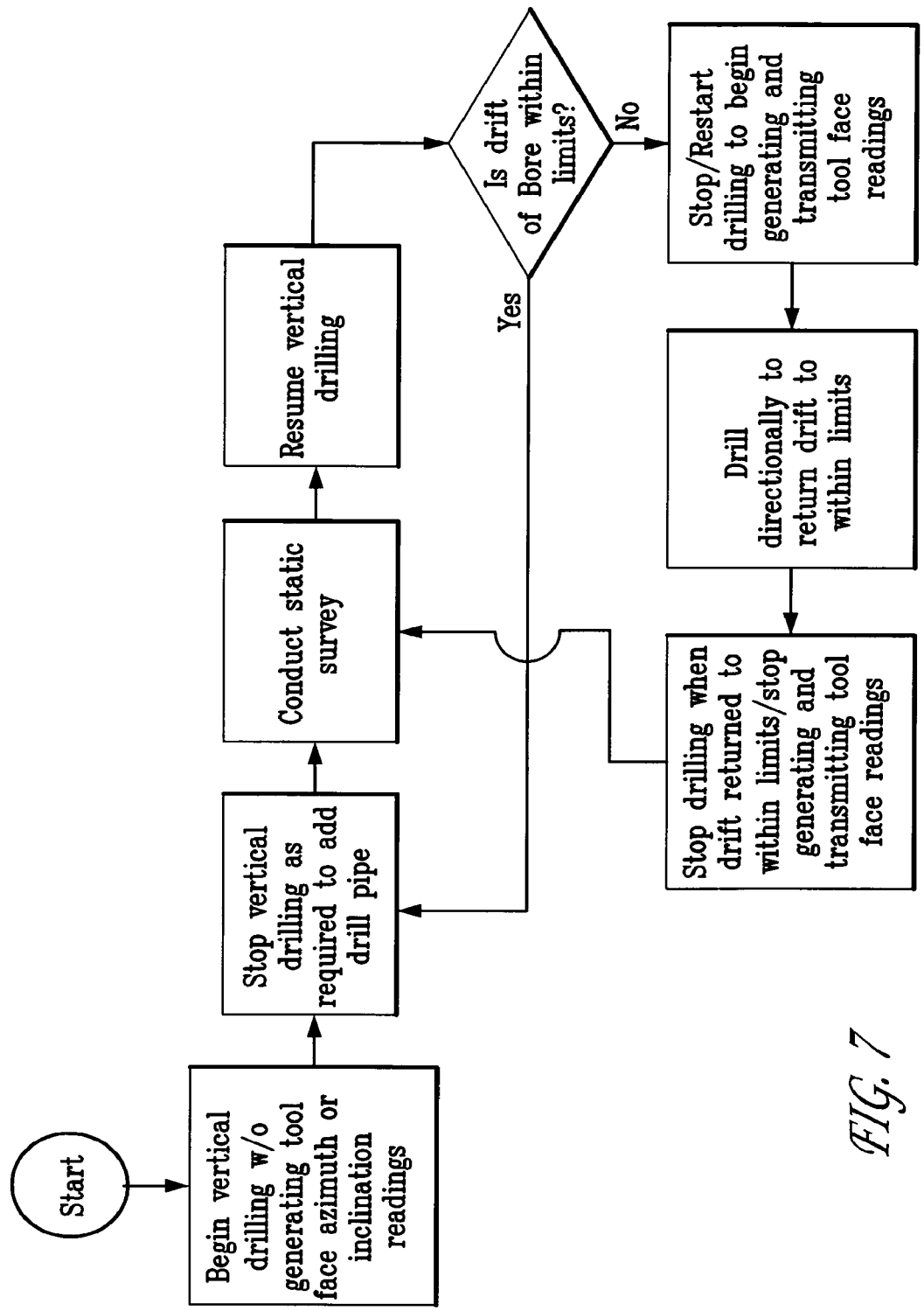
FIG. 7 is a flow diagram depicting a preferred embodiment of a method than can be performed using the system shown in FIGS. 1-6.

For example, vertical drilling can commence while the direction measurement unit 12 and the telemetry system 14 (including the pulser 40) are inactive, i.e., while the direction measurement unit 12 and the telemetry system 14 are not generating and transmitting azimuth, inclination, or tool face readings (see FIG. 7).

A static survey can be conducted after vertical drilling has progressed, in response to a predetermined criterion. For example, the direction measurement unit 12 can be programmed to initiate a static survey each time drilling is stopped, as indicated by the interruption in the flow of drilling mud 114 as sensed by the flow switch 70. (During normal operations, drilling will be stopped each time an additional section of drill pipe 101 is added to the drill string 100.)

The direction measurement unit 12 commences a static survey by acquiring data from the magnetometers 20 and the accelerometers 22, and storing the data in registers within the memory-storage device 30. The direction measurement unit 12 then calculates azimuth and inclination of the bore 112 based on the data, and stores the resulting azimuth and inclination readings in additional registers in the memory-storage device 30. The direction measurement unit 12 can transmit the azimuth and inclination readings to the encoder 36 when drilling resumes following addition of the new section of drill pipe 101, as indicated by resumption in the flow of drilling mud as sensed by the switching device 70. The registers within the memory-storage device 30 that hold the azimuth and inclination readings, and the associated data from the magnetometers 20 and accelerometers 22, can be zeroed upon transmission of the azimuth and inclination readings to the encoder 36.

The encoder 36 and the pulser 40 transmit the azimuth and inclination readings to the surface by way of pressure pulses produced in the drilling mud 114, as discussed above. The pressure pulses can be sensed by the pressure transducer 42, and decoded by the decoder 38. The decoded azimuth and inclination readings can be displayed by the display module 18 in a suitable format, e.g., on a video screen of the computing device 68, by a printout generated by the strip-chart printer 66, etc.

The azimuth and inclination readings can be stored, for example, on the computing device 68. Each set of readings can be stored with other information relating to the readings, such as the time the readings were acquired, the drilling depth at the time of acquisition, etc., so that the static survey can be certified at a later time (provided that an acceptable chain of custody is established for the stored information). This practice can eliminate the need for on-site monitoring of the static survey by a qualified surveyor. The costs of such monitoring, and the potential delays associated with additional monitoring through the use of other devices upon completion of the well, or sections thereof, can thereby be substantially reduced or eliminated.

The static survey data can also be stored, for example, in the memory storage devices 30, 52, 60 of the of the respective direction measurement unit 12, encoder 36, or decoder 38, for retrieval and analysis upon the conclusion of the drilling operations.

The drill rig operators can assess whether the drift of the bore 112 is within a predetermined limit, e.g., less than 5° inclination, based on the azimuth and inclination readings. Vertical drilling can continue, if the drift of the bore 112 is within limits.

Drilling can be interrupted if the azimuth and inclination readings indicate that the drift of the bore 112 is greater than the predetermined limit. Corrective action in the form of directional drilling can subsequently be undertaken, to return the drift of the bore 112 to within acceptable limits.

If necessary, technicians or engineers qualified to oversee directional drilling can be brought on site once the need for directional drilling is identified. The drill string 100 preferably is equipped with the rotary steerable tool 118 or other suitable device for steering the drill bit 104, a discussed above.

The system 10 can provide the tool face readings required to guide the drill bit 104 during directional drilling. The direction measurement unit 12 and the telemetry system 14 can be made active during directional drilling. The direction measurement unit 12 then generates tool face readings on a continuous basis, and the telemetry system 14 continually transmits the tool face readings to the surface via pulses in the drilling mud 114, during directional drilling. The pulses representing the tool face readings are decoded by the decoder 38, and the resulting information is transmitted to the display module 18 for interpretation and analysis by the technicians or engineers directing the drilling operation.

The system 10 can be signaled to begin acquiring and transmitting tool face readings upon the start of directional drilling, in any suitable manner. For example, the direction measurement unit 12 can be programmed to begin acquiring and transmitting tool face readings if the flow of the drilling mud 114 is interrupted, i.e., stopped, for a relatively short, predetermined time period.

The predetermined time period preferably is less than the time required for the direction measurement unit 12 acquire data from the magnetometers 20 and the accelerometers 22, calculate the associated azimuth and inclination readings, and store the readings in the associated registers. The direction measurement unit 12 can be programmed with a delay so that the azimuth and inclination readings are not stored, for example, until approximately one minute has elapsed after the flow of drilling mud 114 has been stopped.

The azimuth and inclination readings are stored in registers within the memory-storage device 30 of the direction measurement unit 12, as discussed above. These registers are zeroed upon transmission of the readings to the encoder 36. Moreover, the registers will continue to read zero until the flow of drilling mud 114 has been stopped for a period of time sufficient for the direction measurement unit 12 to acquire and store a new set of azimuth and inclination readings.

The direction measurement unit 12, upon activation, therefore will read zeros in the noted registers if the flow of drilling mud 114 has been stopped for less than approximately one minute. The direction measurement unit 12 can be programmed to begin generating and transmitting tool face readings under such circumstances. In other words, the direction measurement unit 12 will begin generating and transmitting tool face readings when, upon activation, the registers that store the azimuth and inclination readings in the memory storage device 30 read zero.

Hence, the drill-rig operators, technicians, or engineers can initiate the generation and transmission of tool face readings by activating the mud pump 116, and then deactivating the mud pump 116 for a time period, e.g., thirty seconds, that is less than the time required for the direction measurement unit 12 acquire data from the magnetometers 20 and the accelerometers 22, calculate the associated azimuth and inclination readings, and store the readings in the memory storage device 30.

Directional drilling can continue until the drift of the bore 112 has been returned to within limits. The direction measurement unit 12 can be programmed to cease generating tool face readings at this point, based on cessation of the flow of drilling mud 114 as indicated by the switching device 70. In addition, the direction measurement unit 12 can deactivate the telemetry system 14.

Vertical drilling can be restarted, after the direction measurement unit 12 has been given sufficient time to acquire static survey data to verify that the drift of the bore 112 has returned to within limits.

The system 10 can be used to initiate corrective action during vertical drilling operations, without a need to remove the drill string 100 from the bore 112 for reconfiguration. In particular, the system 10 permits directional drilling to be performed without a need to access the bottom hole assembly 102 to add an MWD tool. Hence, potential delays associated with the need to retrieve and reconfigure the bottom hole assembly 102 can be avoided.

Moreover, the system 10 permits a particular type of relatively high-value information, such as tool face readings, to be acquired and transmitted on a selective basis, without a need to physically reconfigure the drill string 100. In other words, the system 10 gives the user the option of acquiring certain types of information only when the information is needed. This potential can be commercially exploited in various ways.

For example, in applications where the system 10 is leased to the end user, the usage rate can be allocated based on the amount of a particular type of information acquired. In other words, the customer can be charged at first usage rate for the time period during which the system 10 is generating and transmitting a particular type of data, e.g., relatively high-value data such as tool face readings. In applications where the system 10 is used to generate and transmit a second, lower-value type of data, the customer can be charged a second, lower usage rate (or no usage rate at all) for the time during which the system 10 is used to generate and transmit the second type of data.

The system 10 can include provisions to restrict access to high-value information such as tool-face readings. For example, the output module 18 can include a processor 69 that is programmed to permit the display or recording of tool-face readings only upon entry of a password. Alternatively, the processor 69 can be programmed so that a dongle must be used to gain access to tool face readings. The dongle can be, for example, a hardware key inserted into a serial or parallel portion of the output module 18, a key diskette, or other suitable security device.

Alternatively, access to tool-face readings can be restricted by configuring the decoder 38 to decode or transmit the tool-face readings only upon the input of a password, or the use of a dongle. Other components of the system 10 can be configured to restrict access to the tool face readings, in other alternative embodiments.

In other alternative embodiments, access to high-value information such as tool-face readings can be restricted to owners, lessees, or renters of additional display or data processing devices that can be added to the basic system, and contain or use proprietary software that makes the high-value information more usable or accessible. Such devices can include, for example, dedicated rig-floor displays, computers, hand-held devices such as PDAs, or other suitable devices.

According to one method of using the system, the owner of the system leases it to a drill rig operator configured such that while certain information is continuously available to the drill rig operator, the transmission or accessibility of tool-face readings is disabled and can only be enabled by entry of a password that is not provided to the rig operator as part of the lease arrangement. If the rig operator determines that a need exists for tool-face readings, in order to make a directional correction, for example, the owner dispatches a technician to the drill site, at an additional cost. The technician has the password that allows him, and only him, to switch the configuration so that tool-face readings become available. After sufficient too-face readings are obtained, e.g., the drill rig operator is satisfied that the drilling direction is back on course, the operator releases the technician, who returns the tool to its original configuration in which tool-face readings are no longer available. If tool-face readings later become again required, the system owner dispatches the technician and the process is repeated. Thus, in addition to a licensing fee, the system owner recognizes an additional source of income for service charges associated with the technician's retrieval and/or use of tool-face reading.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

Alternative embodiments of the system 10 can be configured to generate and transmit information other than tool face, azimuth, inclination readings. For example, readings of weight on bit, torque on bit, vibration, temperature, pressure, etc., can be generated and transmitted on a selective basis, in the above-described manner.

PARTS LIST

System 10
Direction measurement unit 12

Telemetry system 14
Signal processor 16 (direction measurement unit 12)
Display module 18
Pressure barrel 19
Magnetometers 20
Accelerometers 22
Housing 23 (of probe 19)
Microprocessor 28 (of signal processor 16)
Memory-storage device 30
Computer-executable instructions 32
Encoder 36
Decoder 38
Pulser 40
Pressure transducer 42
Computing device 44 (of display module 18)
Strip-chart printer 46
Microprocessor 50 (of encoder 36)
Memory-storage device 52
Computer-executable instructions 54
Microprocessor 58 (of decoder 38)
Memory-storage device 60
Computer-executable instructions 62
Strip-chart recorder 66 (of display module 18)
Computing device 68
Processor 69 (of output module 18)
Switching device 70
Battery 72
Stator 88 (of pulser 40)
Passages 90
Rotor 92
Drill string 100
Drill pipe 101
Bottom hole assembly 102 (of drill string 100)
Drill bit 104
Drill collar 106
Motor 107
Drilling rig 108
Turntable 109
Earth formation 110
Bore 112
Drilling mud 114
Rotary steerable tool 118

What is claimed is:

1. A method for allocating costs to be paid by a drill rig operator associated with the use of a system capable of at least providing access to information concerning an underground drilling operation, the method comprising:
    drilling a borehole into an earthen formation using a drill string having a bottom hole assembly, said bottom hole assembly comprising a plurality of sensors for providing data relating to said drilling of said borehole;
    encoding said data from said plurality of sensors using a first processor;
    transmitting said encoded data to a location proximate the surface of the earthern formation;
    accessing a first type of information relating to said drilling derived from said encoded data from one or more of said sensors, said first type of information accessed at said location proximate the surface of the earthen formation using a second processor;
    accessing a second type of information relating to said drilling derived from said encoded data from one or more of said sensors, said second type of information accessed at said location proximate the surface using said second processor, said access to said second type of information being prevented unless a predetermined action is taken using said second processor;
    paying a fee for taking said predetermined action taken using said second processor so as to allow access to said second type of information, payment of said fee not being required to access said first type of information.

2. The method of claim 1, wherein the first type of information comprises static survey data, and the second type of information comprises directional drilling data.

3. The method of claim 1, wherein said first type of information comprises azimuth and inclination of said bottom hole assembly.

4. The method of claim 3, wherein said second type of information comprises tool face.

5. The method of claim 1, wherein said second type of information comprises tool face.

6. The method of claim 1, wherein said predetermined action taken to enable access to said second type of information comprises entering a password into the system.

7. The method of claim 1, wherein said predetermined action taken to enable access to said second type of information comprises connecting a dongle to the system.

8. The method of claim 1, wherein said predetermined action taken to enable access to said second type of information comprises procuring the services of a technician capable of accessing said second type of information.

9. The method of claim 1, wherein said predetermined action taken to enable access to said second type of information comprises connecting ancillary equipment to the system.

10. The method of claim 1, wherein:
    the step of drilling a borehole into an earthen formation comprises drilling in a substantially vertical drilling mode during a first period of time and drilling in a directional drilling mode during a second period of time;
    the step of accessing said first type of information is performed in connection with at least said substantially vertical drilling mode; and
    the step of accessing said second type of information is performed in connection with said directional drilling mode.

11. The method of claim 10, wherein drilling in said directional drilling mode is performed following an indication from said first type of information that said bore hole has deviated from substantially vertical, and wherein said directional drilling mode is performed using said second type of information.

12. The method of claim 11, wherein said first type of information comprises azimuth and inclination of said bottom hole assembly and said second type of information comprises tool face.

13. The method of claim 10, wherein said data comprises said azimuth and inclination or is data from which said azimuth and inclination are derived, said transmission of said data to said location proximate the surface occurring when at least a second predetermined action is taken.

14. The method of claim 13, further comprising the step of flowing a drilling fluid through said drill string, and wherein said second predetermined action comprises stopping said flow of drilling fluid, whereby said data is transmitted when said flow of drilling fluid is stopped.

15. The method of claim 12, wherein said plurality of sensors comprises at least an accelerometer and a magnetometer.

16. The method of claim 1, wherein said first type of information is derived from data obtained during a static survey performed following a stoppage in said drilling.

17. The method of claim 16, wherein the step of transmitting said encoded data to said location proximate the surface is performed when drilling is again resumed following said stoppage.

18. The method of claim 1, further comprising the step of flowing a drilling fluid through said drill string, and wherein the step of transmitting said encoded data to said location proximate the surface comprises generating a series of pressure pulses in said drilling fluid that are encoded with said data.

19. The method of claim 1, wherein said first type of information is derived from data obtained during a static survey performed following each of a plurality of stoppages in said drilling, and further comprising the step of storing said first type of information obtained during each of said static surveys.

20. The method of claim 1, wherein said first type of information is derived from data obtained during a static survey performed following each of a plurality of stoppages in said drilling, and wherein said predetermined action allowing access to said second type of information is performed when said first type of information indicates that said drilling has deviated from a predetermined orientation.

21. The method of claim 1, wherein said system is leased from a system supplier, and wherein the step of paying a fee for taking said predetermined action allowing access to said second type of information comprises paying a first usage fee to said system supplier.

22. The method of claim 21, further comprising the step of paying a second usage fee for using said system, and wherein said first usage fee paid for taking said action allowing access to said second type of information comprises an additional usage fee in addition to said second usage fee.

23. The method of claim 1, wherein said system comprises a decoder for decoding said encoded data transmitted to said location proximate the surface, and wherein said decoder comprises said second processor.

24. The method of claim 1, wherein said system comprises a display module for displaying said first and second types of information.

25. A method for allocating costs to be paid by a drill rig operator associated with the use of a system capable of at least providing access to information concerning an underground drilling operation, the method comprising:
  drilling a borehole into an earthen formation using a drill string having a bottom hole assembly, said bottom hole assembly comprising a plurality of sensors for providing data relating to said drilling of said borehole;
  encoding said data from said plurality of sensors using a first processor;
  transmitting said encoded data relating to a first type of information from said bottom hole assembly to a location proximate the surface of the earthern formation;
  transmitting said encoded data relating to a second type of information from said bottom hole assembly to said location proximate said surface of the earthen formation, said transmission of said second type of information occurring only if a predetermined action is taken using a second processor;
  paying a fee for taking said predetermined action taken using said second processor so as to allow transmission of said second type of information from said bottom hole assembly to said location proximate said surface of the earthen formation, payment of said fee not being required to transmit said first type of information.

26. The method of claim 25, wherein the first type of information comprises static survey data, and the second type of information comprises directional drilling data.

27. The method of claim 25, wherein said first type of information comprises azimuth and inclination of said bottom hole assembly.

28. The method of claim 27, wherein said second type of information comprises tool face.

29. The method of claim 25, wherein said second type of information comprises tool face.

30. A method for allocating costs to be paid by a drill rig operator associated with the use of a system capable of at least providing access to information concerning an underground drilling operation, the method comprising:
  drilling a borehole into an earthen formation using a drill string having a bottom hole assembly, said bottom hole assembly comprising a plurality of sensors for providing data relating to said drilling, at least a portion of said drilling comprising drilling in a directional drilling mode;
  encoding said data from said plurality of sensors using a first processor, said data relating to azimuth and inclination and toolface;
  transmitting at least a first portion of said encoded data relating to azimuth and inclination to a location proximate the surface of the earthern formation;
  accessing azimuth and inclination derived from said first portion of said encoded data at said location proximate the surface of the earthen formation using a second processor;
  transmitting at least a second portion of said encoded data relating to toolface to a location proximate the surface of the earthern formation;
  accessing toolface derived from said second portion of said encoded data at said location proximate the surface using said second processor, said accessing of said toolface performed in connection with said drilling in said directional drilling mode, said access to said toolface being prevented unless a predetermined action is taken using said second processor;
  paying a fee for taking said predetermined action taken using said second processor so as to allow access to said toolface, payment of said fee not being required to access said azimuth and inclination.

* * * * *